(12) United States Patent
Varkey et al.

(10) Patent No.: US 8,913,863 B2
(45) Date of Patent: Dec. 16, 2014

(54) REDUCED NYLON HYDROCARBON APPLICATION CABLE

(75) Inventors: Joseph Varkey, Sugar Land, TX (US); Jushik Yun, Sugar Land, TX (US); Byong Jun Kim, Los Altos, CA (US)

(73) Assignee: WesternGeco L.L.C., Houston, TX (US)

( * ) Notice: Subject to any disclaimer, the term of this patent is extended or adjusted under 35 U.S.C. 154(b) by 1017 days.

(21) Appl. No.: 12/409,568

(22) Filed: Mar. 24, 2009

(65) Prior Publication Data

US 2009/0242194 A1 Oct. 1, 2009

Related U.S. Application Data

(63) Continuation-in-part of application No. 12/183,207, filed on Jul. 31, 2008, and a continuation-in-part of application No. 12/260,646, filed on Oct. 29, 2008.

(60) Provisional application No. 61/070,832, filed on Mar. 25, 2008.

(51) Int. Cl.
| | |
|---|---|
| *G02B 6/44* | (2006.01) |
| *H01B 7/24* | (2006.01) |
| *G01V 1/38* | (2006.01) |
| *B32B 19/00* | (2006.01) |
| *F16L 11/11* | (2006.01) |
| *F16L 11/127* | (2006.01) |
| *E21B 17/00* | (2006.01) |

(52) U.S. Cl.
CPC .................................. *F16L 11/127* (2013.01)
USPC ........... 385/107; 385/102; 385/103; 385/108; 385/112; 385/113; 174/120 R; 174/70 R; 174/136; 428/36.91; 428/357; 166/242.2; 367/20

(58) Field of Classification Search
USPC .............. 428/36.91, 290, 302, 921, 382, 383, 428/389, 36.9; 524/90, 261; 385/100–111; 350/96.23, 96.1; 174/120 R, 28, 102, 174/105 R, 120 C, 107.47, 106 SC, 102 R, 174/110 R, 108, 106 D, 110 SR; 138/127, 138/137; 338/214; 367/152, 20
See application file for complete search history.

(56) References Cited

U.S. PATENT DOCUMENTS

| | | |
|---|---|---|
| 2,604,509 A | 7/1952 | Blanchard |
| 3,115,542 A | 12/1963 | Palandri et al. |

(Continued)

FOREIGN PATENT DOCUMENTS

JP 11219626 A * 8/1999

OTHER PUBLICATIONS

Tool Chemical Company, Shore D Hardness Elastomers, CASS Polymers, 2006, pp. 1-2.*

(Continued)

*Primary Examiner* — Jennifer Chriss
*Assistant Examiner* — Altrev Sykes
(74) *Attorney, Agent, or Firm* — Kevin B. McGoff; David Matthews

(57) ABSTRACT

A hydrocarbon application cable of reduced nylon with increased flexibility and useful life. The cable may be of a hose or solid configuration and particularly beneficial for use in marine operations. A power and data communicative core of the cable may be surrounded by a lightweight intermediate polymer layer of a given hardness which is ultimately then surrounded by an outer polymer jacket having a hardness that is greater than the given hardness. Thus, a lighter weight polymer is provided interior of the outer polymer jacket, which may be of nylon or other suitably hard material. As such, the overall weight and cost of the cable may be substantially reduced.

8 Claims, 6 Drawing Sheets

(56) References Cited

U.S. PATENT DOCUMENTS

| | | | |
|---|---|---|---|
| 3,217,083 A | 11/1965 | Gore | |
| 3,328,140 A | 6/1967 | Warren | |
| 3,634,607 A * | 1/1972 | Coleman | 174/120 R |
| 3,928,210 A * | 12/1975 | Peterson | 524/563 |
| 4,505,541 A * | 3/1985 | Considine et al. | 385/107 |
| 4,515,435 A * | 5/1985 | Anderson | 385/103 |
| 4,547,626 A * | 10/1985 | Pedersen et al. | 174/107 |
| 4,597,065 A * | 6/1986 | Lien et al. | 367/20 |
| 4,952,012 A | 8/1990 | Stamnitz | 385/101 |
| 5,212,755 A * | 5/1993 | Holmberg | 385/107 |
| 6,233,384 B1 * | 5/2001 | Sowell et al. | 385/107 |
| 6,417,457 B1 * | 7/2002 | Aasbo et al. | 174/120 R |
| 6,600,108 B1 | 7/2003 | Mydur et al. | |
| 7,005,583 B2 * | 2/2006 | Varkey et al. | 174/120 R |
| 7,170,007 B2 | 1/2007 | Varkey et al. | |
| 7,188,406 B2 | 3/2007 | Varkey et al. | |
| 7,586,042 B2 | 9/2009 | Varkey et al. | |
| 7,793,409 B2 | 9/2010 | Varkey | |
| 7,934,311 B2 | 5/2011 | Varkey | |
| 2005/0288402 A1 * | 12/2005 | Kosaka et al. | 524/90 |
| 2006/0137898 A1 | 6/2006 | Kim et al. | |
| 2006/0151194 A1 | 7/2006 | Varkey et al. | |
| 2006/0260739 A1 | 11/2006 | Varkey | |
| 2007/0000682 A1 | 1/2007 | Varkey et al. | |
| 2007/0107928 A1 | 5/2007 | Varkey et al. | |
| 2008/0031578 A1 | 2/2008 | Varkey et al. | |
| 2008/0066822 A1 | 3/2008 | Varkey et al. | |
| 2008/0128152 A1 | 6/2008 | Varkey et al. | |
| 2009/0038149 A1 | 2/2009 | Varkey | |
| 2009/0089998 A1 | 4/2009 | Varkey | |

OTHER PUBLICATIONS

Indian Plastic Portal, Polyamide (Nylon) 11, www.indianplasticportal.com/pa11.html, pp. 1-2.*

PCT Search Report, dated Dec. 9, 2009, Application No. PCT/IB2009/051224.

* cited by examiner

REDUCED NYLON HYDROCARBON APPLICATION CABLE

CROSS REFERENCE TO RELATED APPLICATIONS

This Patent Document claims priority under 35 U.S.C. §119(e) to U.S. Provisional App. Ser. No. 61/070,832 entitled Multi-Layered Jacket for Marine Seismic, ROV and Other Related Cables, filed on Mar. 25, 2008, which is incorporated herein by reference in its entirety. This patent Document is also a Continuation-In-Part claiming priority under 35 U.S.C. §120 to U.S. application Ser. No. 12/183,207, Methods of Manufacturing Electrical Cables, filed Jul. 31, 2008, and U.S. application Ser. No. 12/260,646, Methods of Manufacturing Electrical Cables, filed Oct. 29, 2008, both of which are incorporated herein by reference in their entirety.

FIELD

Embodiments described relate to cables for use in hydrocarbon applications. These cables may include solid cables as well as hoses configured for use in hydrocarbon environments for exploration, monitoring and recovery applications. In particular, lighter weight marine cables of reduced expense and enhanced flexibility are disclosed.

BACKGROUND

A variety of hydrocarbon exploration and other applications involve the use of cables. The cables may include hoses and solid cables which are employed to provide a link between an underwater or subterranean hydrocarbon environment and a surface location. Operators of hydrocarbon application equipment may be positioned at the surface location. From this location, hydrocarbon tools therebelow may be directed and serviced through the noted hydrocarbon application cables. Examples of hydrocarbon application hoses in particular may include seismic gun hoses for carrying pressurized air, drilling hoses for transfer of cuttings and drilling fluid, and even coiled tubing for delivering pressurized fluid and tools to a downhole environment.

As indicated, the above noted hoses may often be configured to accommodate a significant pressure therethrough as compared to the surrounding environment. Additionally, the surrounding environment itself may present substantial stress on such hoses. For example, in the case of hydrocarbon application hoses for marine seismic exploration, the surrounding environment may present extreme arctic temperatures as low as about −30° C. Further, the inherent nature of the exploration application may subject the hoses to a substantial amount of hydrolysis, ultraviolet sunlight and other hazards.

Efforts to address the internal pressure of the hose and hazards as noted above may include wrapping polymer tape about the internal conductive core of the hose. The tape may include a 50% or greater overlap and, in combination with other hose features, provide generally sufficient resistance to blowout from the internal pressure of air delivered through the hose. Additionally, the tape may provide the hose with a degree of flexibility that is well suited for marine use. Furthermore, the tape may be surrounded by an outer polymer jacket configured to withstand the hazards of the noted surrounding environment.

Unfortunately, the life and durability of marine seismic exploration hoses remains compromised in spite of the added measures noted above. In particular, while the polymer tape may be well suited for marine use in terms of providing flexibility and blowout resistance, the use of an overlapping tape inherently leaves seams throughout the hose. As such, the hose is replete with discontinuities. That is, every seam provides a potential stress riser. Thus, as the hose repeatedly bends over the course of an operation, the outer polymer jacket may be subjected to the stresses of the immediately underlying seams. Ultimately, the life of the hose may be substantially reduced due to cracking of the outer polymer jacket brought on by the underlying stress risers.

In order to extend the useful life of a marine hose, the underlying polymer tape may be replaced with extruded nylon. In particular, nylon 11 and nylon 12 are often employed in this manner. The underlying nylon may be surrounded by the outer polymer jacket immediately thereabout. By replacing the tape with an extruded nylon polymer, stress risers from tape seams may be eliminated. As such, the outer polymer jacket may avoid being subjected to induced cracking as detailed above. Additionally, nylon may be substantially resistant to arctic temperatures and other marine environmental conditions.

Unfortunately, the use of extruded nylon in this manner, may significantly drive up the cost of the marine hose. For example, as of the date of the present patent document, extruded nylon as described may range from about $6-$10 per pound. Ultimately, the replacement cost for such a hose may be well in excess of $100,000. Furthermore, even with improved durability, the life of the hose is unlikely to exceed about five years when employed in regular use.

In addition to an increase in hose expense, the use of nylon about the core may significantly affect the overall weight and flexibility of the hose. For example, given the normal 2,000-5,000 foot length of the cable, the added weight may pose a significant challenge to conventional spooling and deployment techniques and equipment. Similarly, the increased rigidity of the hose may present further challenges in terms of hose manageability during deployment, use and retrieval of the hose. In sum, the operator of a marine seismic operation is generally left with the option of employing a more expensive and less manageable hose or reverting to a hose with a tape wrapped core that is prone to a shorter useful life.

SUMMARY

A hydrocarbon application cable is disclosed with a communicative core. The core may be surrounded by a lightweight intermediate polymer layer of a given hardness. A wear resistant outer polymer jacket may be disposed about the lightweight intermediate polymer layer and be of a hardness greater than the given hardness.

DETAILED DESCRIPTION

Embodiments of hydrocarbon application cables are described herein with reference to certain types of hydrocarbon applications. In particular, seismic gun hoses are described for use in marine exploration applications. However, a variety of other applications may employ cables as described herein. Regardless, embodiments described herein may include a marine cable with a communicative core that is surrounded by both a lightweight intermediate polymer layer and a wear resistant outer polymer jacket of comparatively greater hardness. As such, the overall weight of the cable may be kept to a minimum and flexibility enhanced, without significant sacrifice of cable resistance to harsh surrounding environments. Such configurations may be achieved through manufacturing techniques also detailed herein.

Figure 1:
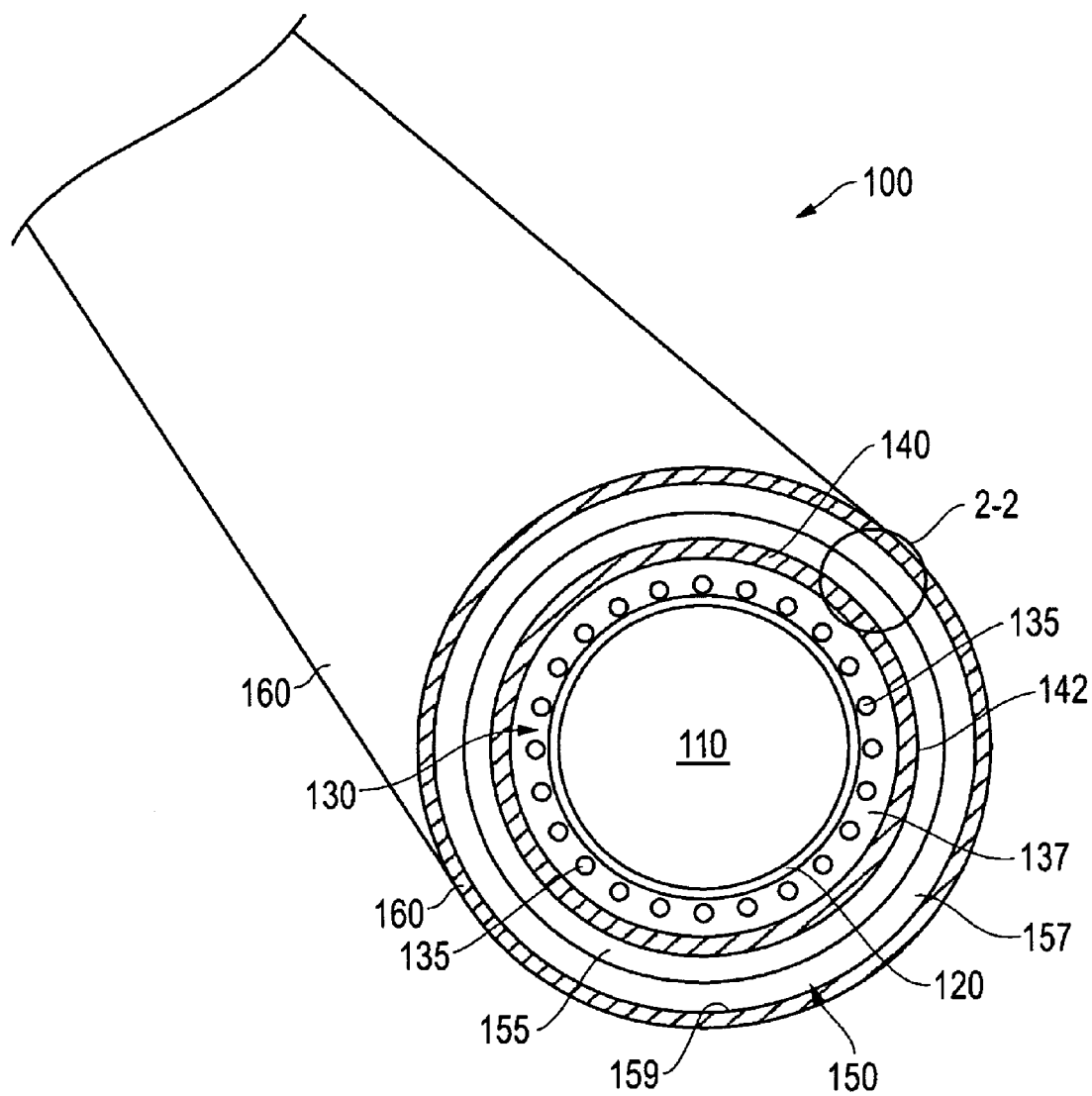
FIG. 1 is a perspective cross-sectional view taken from 1-1 of FIG. 3 of an embodiment of a hydrocarbon application cable of a hose configuration.
Figure 3:
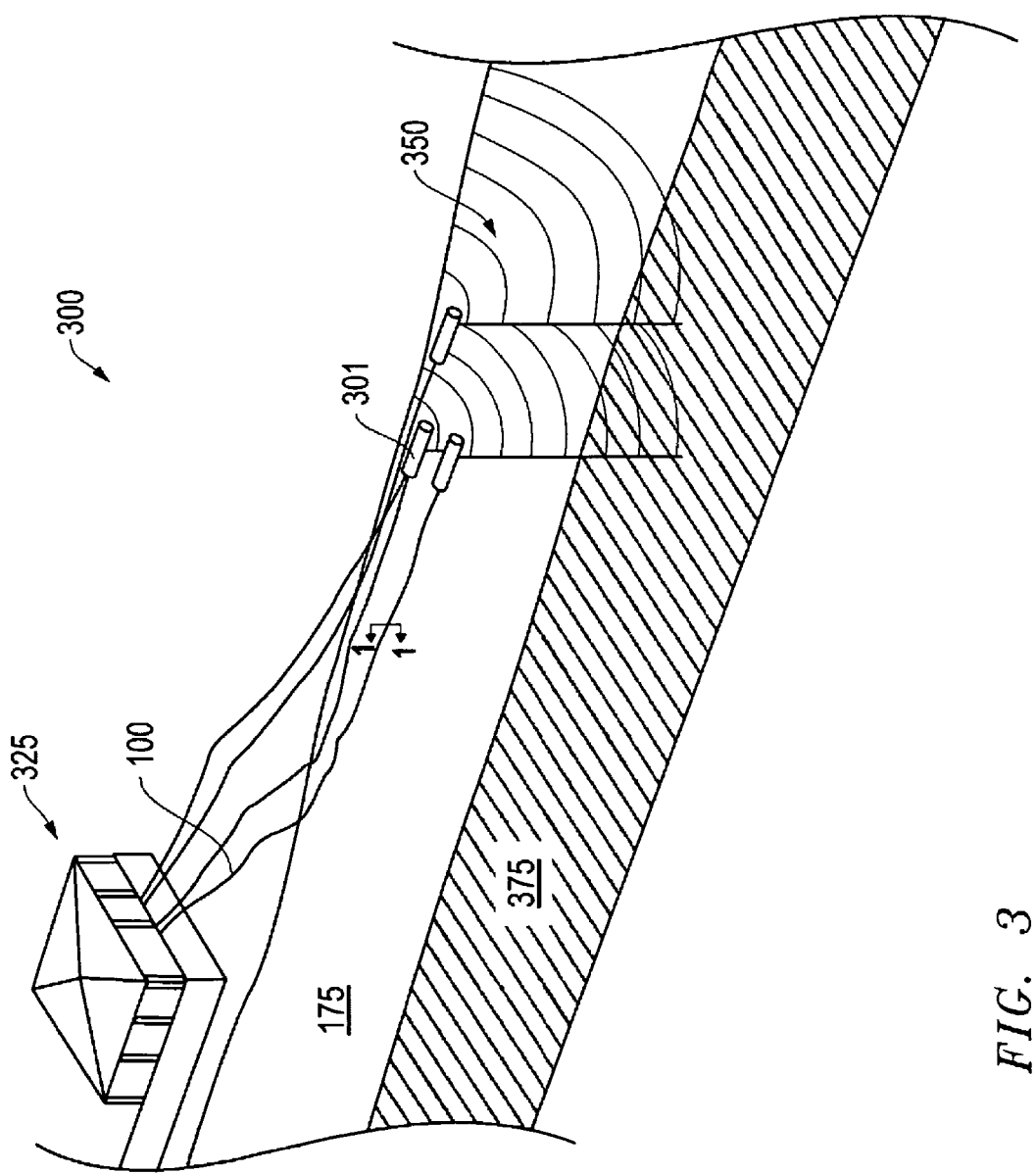
FIG. 3 is a perspective overview of the hydrocarbon application cable of FIG. 1 employed in a marine application.

Referring now to FIG. 1, a perspective cross-sectional view of an embodiment of a hydrocarbon application cable 100 is shown that is of a hose configuration. That is, an internal space 110 is provided defined by a conventional liner 120. A communicative core 130 is provided to allow power transfer and communication between surface equipment and a deployed tool. For example, as depicted in FIG. 3 and detailed further below, the cable 100 may be deployed from a marine vessel 325 to drag a seismic gun 301 through water 175. As such, the core 130 may provide communicative capacity between the vessel 325 and the gun 301. In furtherance of this communicative capacity, the core 130 may be equipped with conventional data and/or power conductors 135 imbedded within conventionally employed electrical insulating material 137.

Opposite the core 130, the outer portion of the cable 100 may be defined by a wear-resistant outer polymer jacket 160. The jacket 160 may be of a substantial hardness and well suited for exposure to harsh environments without significant cracking or deterioration. The jacket 160 may be of materials having a melting point greater than about 160° C. However, the jacket 160 may also be well suited for use in colder temperatures. For example, in the embodiment shown, the cable 100 may be deployed in arctic water 175 of about −30° C. (also see FIG. 3). As such, the jacket 160 may be of an extrudable material with a hardness of between about 40 and 95 shore D so as to avoid substantially cracking and deterioration upon regular use in such environments. In one embodiment, nylon, such as nylon 11 or 12 may be employed. A polyolefin, polyurethane, or other suitable material of similar hardness may also be utilized. In the case of polyolefin, a crosslinkable variety may be employed. Similarly, nylon and polyurethane may be of reinforced varieties, and any polyurethane employed may be of an amended thermoplastic variety. Regardless, the material selected for the jacket 160 may be of significantly greater hardness and wear resistance than material of an underlying lightweight intermediate polymer region 150. As described below, the use of such a lighter material in this region 150 reduces the overall expense and weight of the cable 100 and provides greater flexibility.

A host of layers 140, 142, 155, 157, 159 may be disposed between the above-described core 130 and the outer polymer jacket 160. As alluded to above, these may include layers 155, 157 that make up a lightweight intermediate polymer region 150. Thus, in the embodiment shown, these layers may accordingly be interior 155 and exterior 157 lightweight intermediate polymer layers. Such layers 155, 157 may be made up of any number of material types having a hardness of less than about 90 shore D. Indeed, the materials selected for the lightweight intermediate polymer layers 155, 157 may match those selected for the jacket 160 with the exception of hardness. For example, polyolefin and polyurethane material types may be utilized that are less than about 90 shore D in hardness. In the case of polyolefin, the material may be amended and/or crosslinkable, whereas the polyurethane may be reinforced. Additionally, conventional soft polymers ranging from about 35 Shore A to 60 shore D in hardness may be employed. Examples of these polymers may include thermoplastic elastomers such as styrene block copolymers, thermoplastic vulcanizates, and olefinic elastomers.

In the embodiment shown, an inner polymer jacket layer 140 is disposed about the core 130 that is of a similar hardness and other character to the outer polymer jacket 160. However, in the case of the inner polymer jacket 140, the use of such a similarly hard materials immediately about the core 130 may be a matter of manufacturing preference. For example, a polymer having a hardness of greater than about 40 shore D may be employed about the core 130 as a matter of insulating and protecting the more sophisticated architecture of the core 130 from the subsequent formation of other cable layers 142, 155, 157, 159, 160 during the manufacturing process. Thus, for the embodiment of FIG. 1, the material choices for the inner polymer jacket 140 may again be along the lines of nylon, polyolefin, and polyurethane varieties of suitable hardness as indicated. To minimize the occurrence of stress risers, the inner polymer jacket 140 may be provided via extrusion. However, in other embodiments, polymeric tape may be employed to provide the jacket 140. The softer nature of the lightweight intermediate polymer region 150 may substantially absorb stress risers so as to allow for such a tape variety of inner jacket 140 without significant harm to the cable 100 over time.

In the embodiment of FIG. 1, additional tie layers 142, 159 are provided between the jacket layers 140, 160 and the lightweight intermediate polymer region 150. That is, as alluded to above, a conventional cable is often of solid nylon jacketing from its core to its outer surface. However, embodiments such as the depicted cable 100 may interpose a material region 150 (layers 155, 157) that is substantially lighter and of differing character from that of the jacket layers 140, 160. Indeed, in one embodiment, less than half of cable 100, cross-sectionally, will be made up of polymer layers having a hardness of greater than about 40 shore D. While this may be advantageous in terms of providing enhanced flexibility, reduced cost, weight and other benefits to the cable 100, it may also introduce physically new interfaces between the region 150 and the jacket layers 140, 160. Therefore, the noted tie layers 142, 159 may be provided between the region 150 and the jacket layers 140, 160 to help ensure adequate adhesion therebetween as indicated further below.

Figure 2:
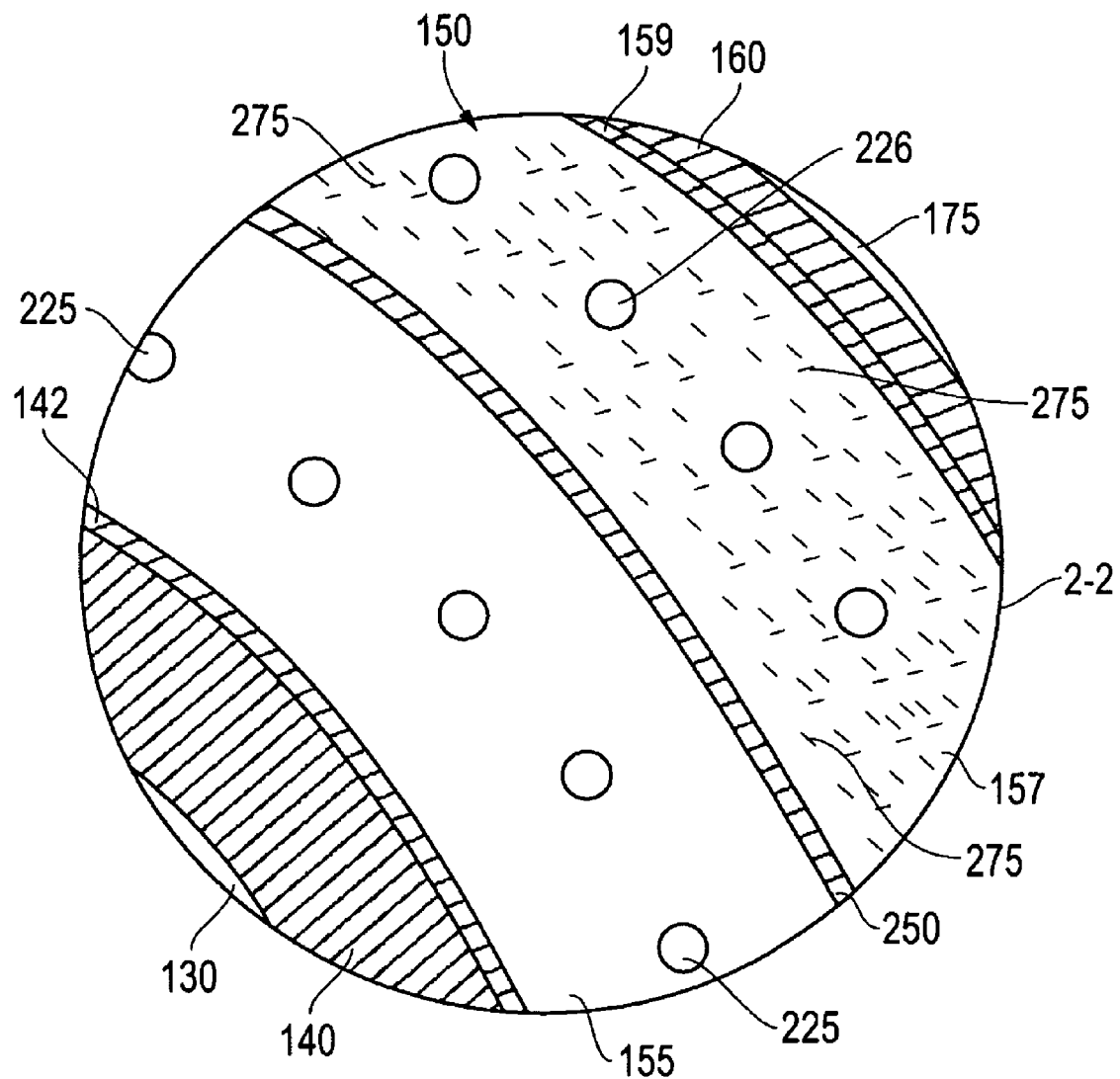
FIG. 2 is an enlarged view of the hydrocarbon application cable taken from 2-2 of FIG. 1.

Continuing now with added reference to the enlarged view of FIG. 2, taken from 2-2 of FIG. 1, an inner tie layer 142 and outer tie layer 159 are depicted. The noted tie layers 142, 159 may employ polymers amended with an adhesion promoter to promote chemical bonding with respective neighboring jacket 140, 160 and lightweight intermediate polymer layers 155, 157 simultaneously. In one embodiment, the tie layer may include a polyolefin with an adhesion promoter in the form of an unsaturated anhydride, carboxylic acid, acrylic acid, and/or silane. In the case of an unsaturated anhydride, maleic anhydride or 5-norbornene-2, 3-dicarboxylic anhydride may be employed. Regardless, bonding throughout the cable 100 may ultimately be attained sufficiently to allow the cable 100 to substantially behave as a unitary body, irrespective of the multitude of employed layers 120, 130, 140, 142, 155, 157, 159, 160.

Continuing with reference to FIG. 2, the outer polymer jacket 160 is shown adhered to the exterior lightweight intermediate polymer layer 157 through the above-noted outer tie layer 159. In one embodiment, the jacket 160 may be of nylon 11 or 12 as noted above. However, in other embodiments, alternative wear-resistant materials of sufficiently high hardness may be employed. As noted above, these materials may include polyurethane, a thermoplastic polyurethane, and crosslinkable polyolefin. Additionally, a modified polyphenylene sulfide may be employed. In the case of nylon and polyurethane, reinforced varieties may be employed with fibers or fillers of glass, carbon, graphite, clay, silica, and polytetrafluoroethylene. Additionally, in the case of crosslinkable polyolefin, a catalyst and/or an ethylene vinyl silane copolymer may be combined with the polyolefin.

Furthermore, the inner polymer jacket 140 may be made up of any of these same materials, and, as a matter of processing efficiency, may often be made up of the same material combination selected for the outer polymer jacket 160 as noted above. In an alternate embodiment, however, the inner jacket 140 may be made up of a base material that is of a hardness less than that of the outer jacket 160. For example, the outer jacket 160 may be nylon and the inner jacket 140 a polyurethane, thermoplastic or otherwise, that is of a hardness less than nylon and harder than the lightweight intermediate polymer region 150. In such an embodiment, a separate thin nylon layer may be interposed between the inner jacket 140 and the lighter adjacent region 150.

Examining the depicted underlying lightweight intermediate polymer region 150 more closely, armor wire 226, 225 is shown incorporated into both the exterior 157 and interior 155 layers thereof. This may be provided to the cable 100 via techniques detailed further herein-below. Such wire 225, 226 may be particularly beneficial for a cable 100 to be employed as a seismic gun cable (see FIG. 3), where pressurization and blow-out prevention may be of significant concern. In the embodiment shown, the armor wire 225, 226 may be of copper, stainless steel, or other structurally suitable metal-based material.

The exterior lightweight intermediate polymer layer 157 of the embodiment depicted in FIG. 2 is a polyurethane material reinforced with fibers 275. The fibers 275 may be of glass, carbon, graphite, clay, silica, and polytetrafluoroethylene. Additionally, smaller fillers of such materials may be employed in place of the fiber-form. Also, aside from polyurethane or soft polymers as noted above, poyolefins of appropriate hardness (i.e. below about 90 shore D) may also be employed. These may include polyethylene of varying density, ethylene-propylene copolymer, amended polyolefins with adhesion promoters as noted above, crosslinkable polyolefin, and thermoplastic polyurethane. In the case of crosslinkable polyolefin, a catalyst and/or ethylene vinyl silane copolymer may be incorporated therein.

Continuing with reference to FIG. 2, a lightweight transition layer 250 is depicted between the exterior 157 and interior 155 lightweight intermediate polymer layers. That is, in the embodiment depicted, the exterior layer 157 is reinforced with fibers 275 whereas the interior layer 155 is not. Thus, a deliberately discrete and well defined transition layer 250 may be provided. Alternatively, a natural transitioning between the different intermediate layers 155, 157 may provide the transition layer 250 during the manufacturing process. Additionally, the interior layer 155 may be made up of materials as detailed above for the exterior layer 157. Furthermore, as a matter of process efficiency and chemical and mechanical compatibility, the base material selected for the different layers 155, 157 may be the same material. By the same token, given that the inner jacket 140 about the core 130 is generally of the same material as the outer jacket 160, the inner tie layer 142 is generally of the same material as the outer tie layer 159 as described above.

With all of the above-noted layering in mind, reference is again drawn to the cross-sectional view of the cable 100 as depicted in FIG. 2. In this depiction, it is apparent that the harder, heavier, less flexible material of the jacket layers 140, 160 makes up less than about half of the overall material of the cable 100. Thus, in comparison to a conventional nylon-based cable, the cable 100 may indeed be a hydrocarbon application cable of reduced nylon (or other similarly hard material). Thus, the cable 100 may be lighter, cheaper, and of enhanced flexibility as compared to a conventional nylon-based cable. Furthermore, as alluded to above and described further below, this may be achieved through the use of particular materials and techniques which allow the manufactured cable 100 to behave in a cohesive and unitary fashion.

Referring now to FIG. 3, a perspective overview of a hydrocarbon application cable 100 as described above is depicted as part of an assembly in a marine setting 300. The cable 100 is of a hose configuration for accommodating a seismic gun 301 along with a host of additional cables and guns. The cable 100 and gun 301 assemblies along with manowing assemblies and other equipment may be towed beneath water 175 behind a ship 325. In this manner, seismic waves 350 may be generated as a manner of collecting information regarding a formation 375. The cables 100 in the embodiment shown may be between about 3,000 and 4,000 feet in length. Nevertheless, deployment, manipulation, and retrieval of the cables 100 may be carried out in a more user-friendly manner due to their lighter nature and added flexibility as compared to conventional gun cables. Furthermore, the cables 100 themselves may be of reduced expense without substantial sacrifice to wear, durability and overall useful life.

Figure 4A:
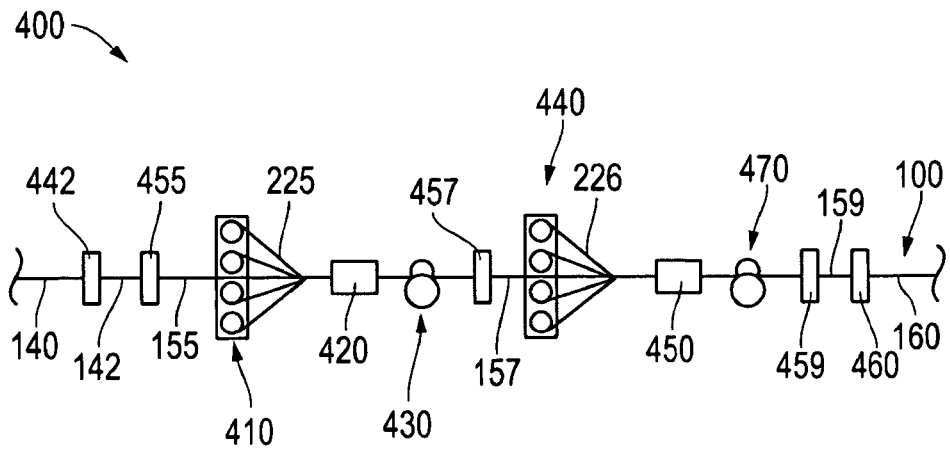
FIG. 4A is a schematic view of an embodiment of an assembly for manufacturing the hydrocarbon application cable of FIG. 1.

Referring now to FIG. 4A, with added reference to FIG. 1, a schematic view is depicted of an embodiment of an assembly 400 for manufacturing a hydrocarbon application cable 100 as described above. The cable 100 is formed from the inside out, with the inner-most portions directed toward polymer extruders 442, 455. That is, as shown in FIG. 4A, the inner jacket 140 with underlying core 130 is directed toward an inner tie extruder 442 for providing of the inner tie layer 142. An interior lightweight intermediate polymer layer 155 is then provided by way of a first lightweight polymer extruder 455.

The polymer coated cable may then be directed toward a first armoring mechanism 410 where interior armor wire 225 may be disposed about the interior intermediate polymer layer 155. In the embodiment shown, the assembly 400 includes first heating 420 and shaping 430 mechanisms for imbedding of the interior armor wire 225 into the intermediate polymer layer 155. Thus, the exterior polymer layer 157 may be extruded over the interior polymer layer 155 via the second lightweight polymer extruder 457. Similar techniques may ensue to provide the exterior armor wire 226 to this exterior polymer layer 157. That is, a second armoring mechanism 440 may provide the exterior armor wire 226 to the exterior polymer layer 157. Subsequent heating through second heating 450 and shaping 470 mechanisms may result in a multi-layered armored lightweight intermediate polymer region of the cable 100.

The cable 100 may then be exposed to an outer tie extruder 459 for providing the outer tie layer 159. Thus, adhesion of the outer jacket layer 160, as provided by the outer jacket extruder 460, may be promoted. Ultimately a cohesive cable 100 of unitary behavioral character may be formed according to such techniques.

Figure 4B:
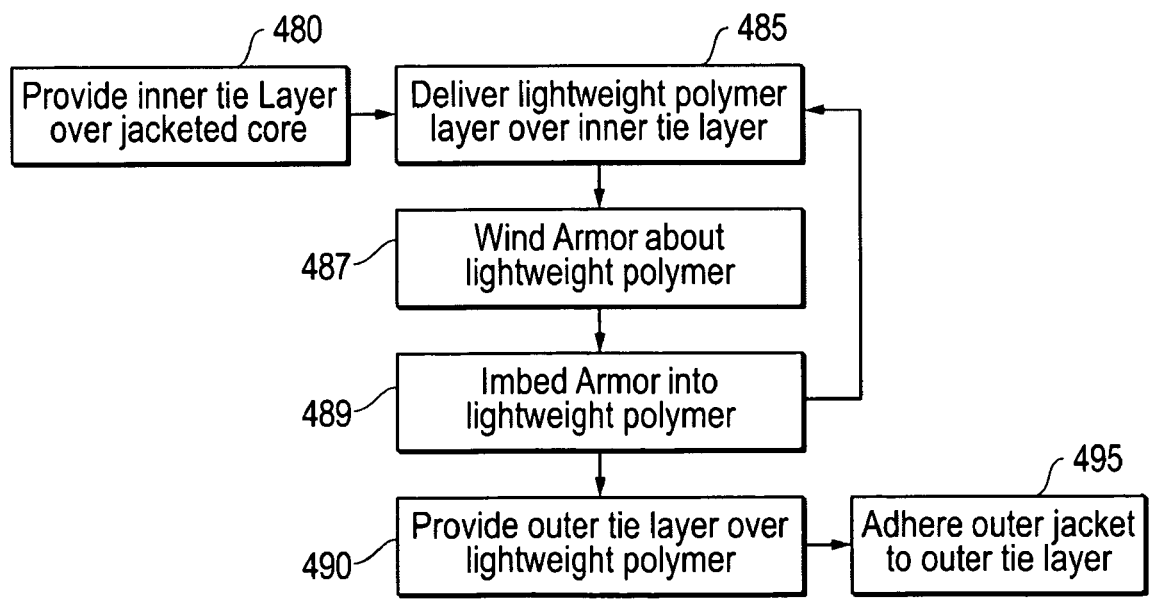
FIG. 4B is a flow-chart summarizing an embodiment of manufacturing the hydrocarbon application cable of FIG. 1.

Referring now to FIG. 4B, a flow-chart is depicted which summarizes an embodiment of manufacturing the cable 100 according to the techniques described above. Thus, as indicated at 480, an inner tie layer may be provided over a jacketed core. Lightweight polymer layers and armor windings may then be provided with the windings imbedded as described above and noted at 485, 487 and 489. This may be repeated multiple times as indicated in the schematic of FIG. 4A. Ultimately, once delivering of the lightweight polymer and armor is completed, an outer tie layer may be provided as indicated at 490. Thus, the outer jacket may be adhered to the outer tie layer as indicated at 495.

The flow-chart of FIG. 4B describes independently extruded layering. However, in alternate embodiments co-extrusion of various layers may be employed. For example, the inner tie layer and initial lightweight polymer layer may be co-extruded. Additionally, the outer tie layer and outer jacket may be co-extruded. In fact, in embodiments where the use of intervening armor is avoided, lightweight polymer layers may also be co-extruded. In such circumstances, this may be particularly beneficial from a process efficiency standpoint.

Figure 5:
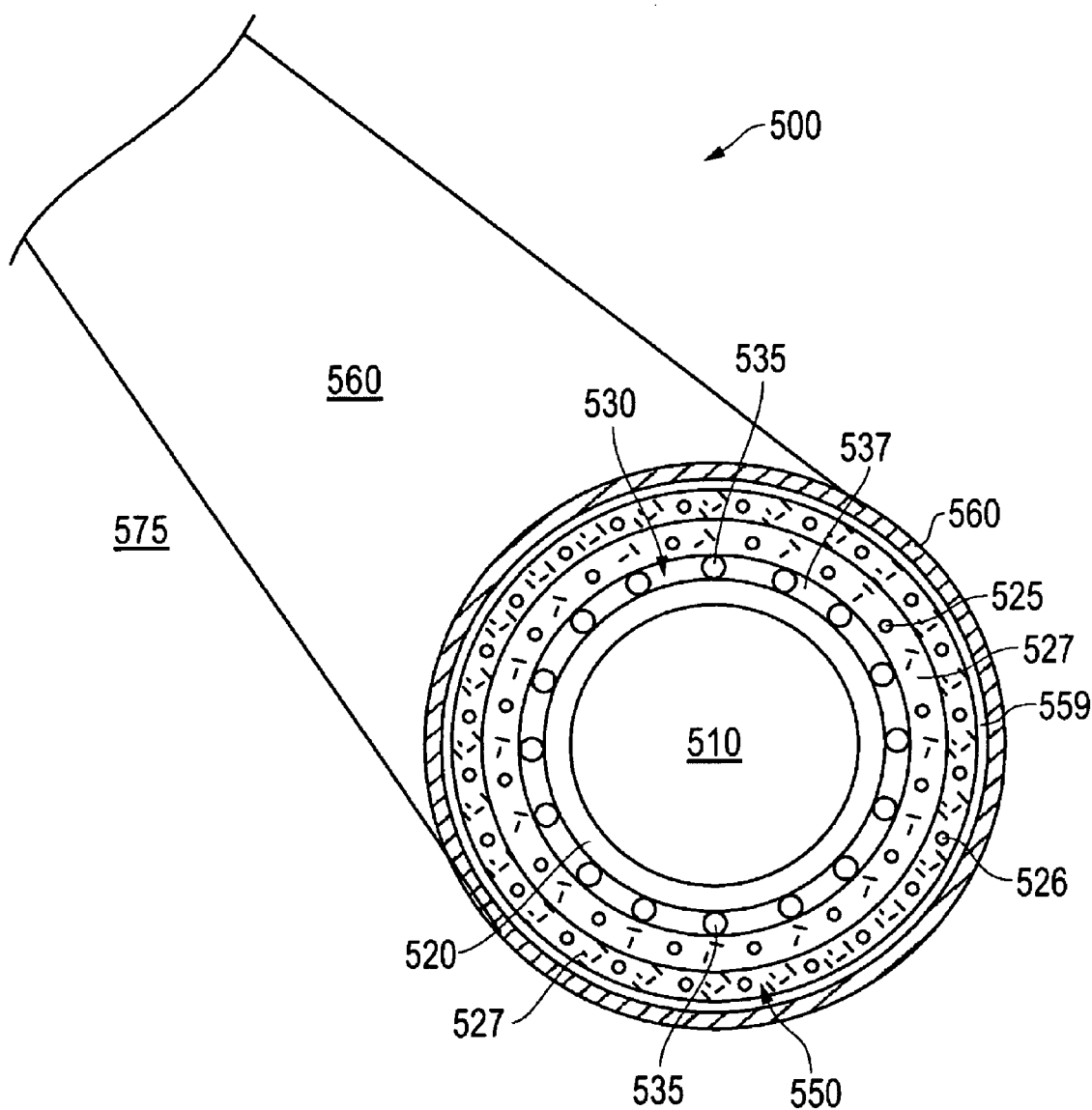
FIG. 5 is a perspective cross-sectional view of an embodiment of a hydrocarbon application cable of a hose configuration.

Referring now to FIG. 5, a perspective cross-sectional view of an alternate embodiment of a hydrocarbon application cable 500 is shown. Again, the cable 500 is of a hose configuration with an internal space 510 defined by a conventional liner 520. As such, it may be employed for use as a seismic gun cable, similar to those depicted in FIG. 3. Additionally, in the embodiment of FIG. 5, a power and data communicative core 530 is depicted with conductors 535 and insulating material 537. Further, an outer jacket 560 is provided about the cable 500 for protection from a potentially harsh environment such as below water 575. However, as described below, the cable 500 is provided without an inner jacket of comparatively higher hardness about the core 530. Rather, lightweight material with a hardness of less than about 90 shore D, is provided directly about the core 530.

Similar to the embodiment of FIG. 1, the embodiment of FIG. 5 includes a lightweight intermediate polymer region 550. As depicted, this multiple layered region 550 is provided directly about the core 530 and is of a hardness of less than about 65 shore D as alluded to above. Thus, exterior to the core 530, only the layer of the outer jacket 560 may be of greater hardness. As a result, the cable 500 may be of even greater flexibility and its overall cost and weight even further reduced. In the embodiment shown, less than about one third of the cable 100, cross-sectionally includes polymer layers, such as the outer jacket 560, which are of a hardness greater than about 40 shore D. Alternatively, in another embodiment, outer layers of the cable 500 which are greater than about 40 shore D in hardness may make up the majority of the cable 500 cross-sectionally. In one such embodiment, an outer jacket 560 and underlying armored layers, all of crosslinkable polyolefin, may be provided for a cable 500 in this manner (while also eliminating any inner jacket about the core 530).

Continuing with reference to FIG. 5, the intermediate polymer region 550 may be of reinforced polymers as noted by fibers 527. Additionally, the region 550 may be armored (see armor wire 525, 526). Further, an outer tie layer 559 may be provided to enhance adhesion between the intermediate polymer region 550 and the outer jacket 560. Indeed, with the notable exception of the absence of an inner jacket such as that of FIG. 1 (see 140), the materials and structure of the layers 560, 559, 550 of the cable 500 may be selected from the same options as those detailed above for the embodiment of FIG. 1.

Figure 6A:
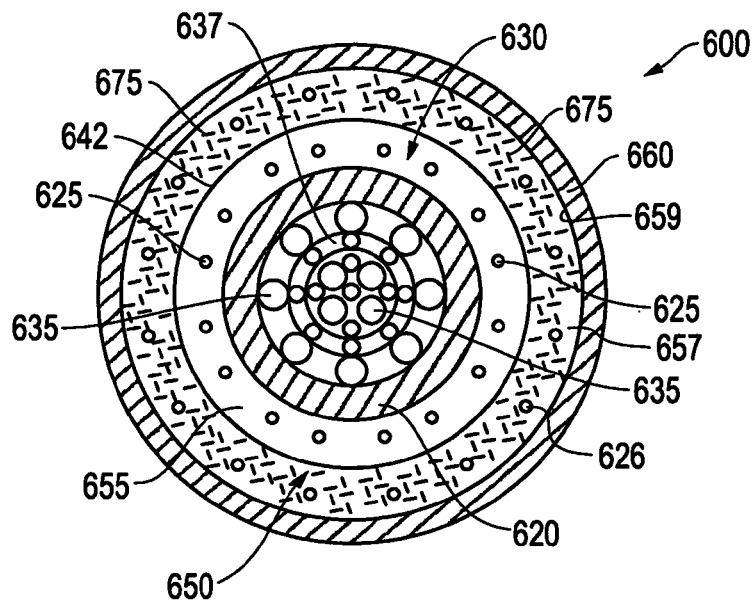
FIG. 6A is a cross-sectional view of an embodiment of a hydrocarbon application cable of a solid configuration.
Figure 6B:
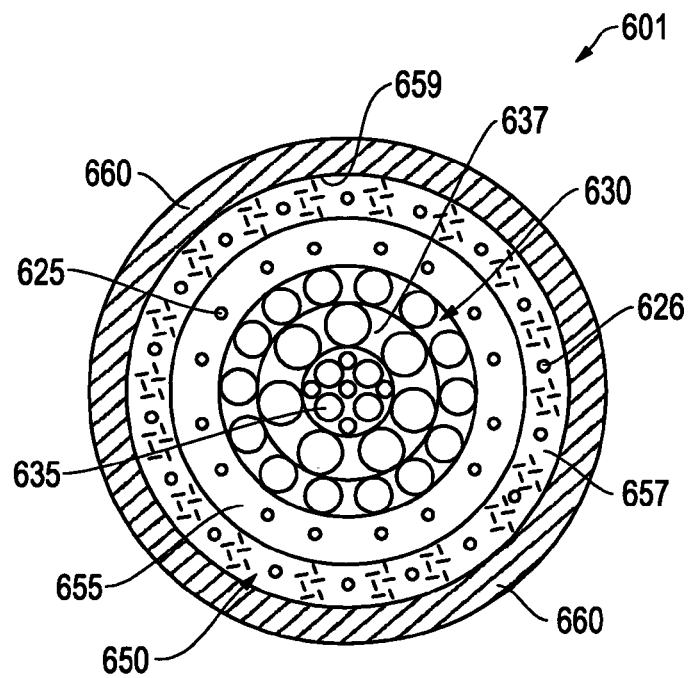
FIG. 6B is a cross-sectional view of an embodiment of a hydrocarbon application cable of a solid configuration.

Referring now to FIGS. 6A and 6B, cross sectional views of solid hydrocarbon application cables 600, 601 are depicted. For example, as opposed to seismic gun cables, the depicted cables 600, 601 may be well suited for use in marine applications as mannowing adapters or lead-in cables which lack an interior passage or space. Nevertheless, similar material and feature choices may be employed in such cables 600, 601 as detailed above with reference to the embodiments of FIGS. 1 and 5.

With particular reference to FIG. 6A, a solid cable 600 with a multi-layered core 630 is depicted. The cable 600 is similar to that depicted in FIG. 1 with the exception of a differently configured core 630 lacking an internal space 110 as alluded to above. As depicted, the core 630 includes conventional conductors 635 which are surrounded by insulating material 637. An inner jacket 640 is provided about the core 630 with an inner tie layer 642 thereabout. Thus, adhesion of layers 655, 657 of an intermediate polymer region 650 to the core 630 may be enhanced. These layers may include armor wire 625, 626 and reinforcing fiber 657 (or filler). Further, an outer tie layer 659 may be provided about the region 650 to enhance adhesion of the outer jacket 660 thereto.

Ultimately, while the cable 600 differs from the embodiment of FIG. 1 in that it is configured in a solid fashion lacking internal space, layers with hardness exceeding about 40 shore D are limited to the inner 640 and outer 660 jacket layers. Thus, a cable 600 of reduced weight and cost is provided along with enhanced flexibility and manageability. Further, like the embodiment of FIG. 1, less than about half of the cable 600 cross-sectionally includes polymer layers that are of a hardness greater than about 40 shore D.

With particular reference to FIG. 6B, a solid cable 601 with a multi-layered core 630 is again depicted similar to that of FIG. 6A, with the exception of the lacking of an inner jacket 640. Stated another way, FIG. 6B depicts a cable 601 that is similar to the embodiment depicted in FIG. 5 (with the exception of a lacking internal space 510). As depicted, the core 630 includes conventional conductors 635 which are surrounded by insulating material 637 just as in the case of FIG. 6A described above. However, the elimination of an inner jacket 640 may allow for layers 655, 657 of an intermediate polymer region 650 to adhese to the core 630 without need for an inner tie layer 642. Again, these layers may include armor wire 625, 626 and reinforcing fiber 657 (or filler). Further, an outer tie layer 659 may again be provided about the region 650 to enhance adhesion of the outer jacket 660 thereto. Ultimately, like other embodiments detailed hereinabove, less than about half of the cable 601 cross-sectionally includes polymer layers that are of a hardness greater than about 40 shore D. Thus, a cable 601 of reduced weight and cost is provided that is also of enhanced flexibility and user-friendliness.

Embodiments described hereinabove provide for hydrocarbon application cables suitable for use in marine operations. The cables may be solid or of a hose configuration. Regardless, the overall expense and weight of the cables may be substantially reduced as compared to conventional cables for such operations. This may be achieved through the significant reduction in the amount of nylon or other polymers of comparable hardness throughout the body of the cables. Nevertheless, cables detailed hereinabove are also configured of sufficient durability for regular use in harsh environments including arctic waters, without compromise to overall life or effectiveness.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A marine hydrocarbon application cable comprising:
   a communicative core;
   an inner polymer jacket of a first hardness about said communicative core;
   an intermediate polymer region of a given hardness about the inner polymer jacket; and
   an outer polymer jacket of a second hardness about the intermediate polymer region, the first hardness substantially equal to the second hardness and the first hardness and the second hardness greater than the given hardness.

2. The marine hydrocarbon application cable of claim 1 wherein the first hardness and the second hardness are between about 40 shore D and about 95 shore D and the given hardness is between about 35 shore A and 60 shore D.

3. The marine hydrocarbon application cable of claim 1 wherein less than about 50% of the body of the cable cross-sectionally is of a hardness greater than about 40 shore D.

4. The marine hydrocarbon application cable of claim 1 further comprising:
   an adhesion promoting inner tie layer disposed between the inner polymer jacket and the intermediate polymer region; and
   an adhesion promoting outer tie layer disposed between the intermediate polymer region and the outer polymer jacket.

5. The marine hydrocarbon application cable of claim 1, wherein the intermediate region comprising an interior layer and an exterior layer, wherein one of the interior layer and the exterior layer is reinforced with fibers and the other of the interior layer and the exterior layer is not reinforced by fibers.

6. The marine hydrocarbon application cable of claim 5, wherein the first hardness and the second hardness are between about 40 shore D and about 95 shore D and the given hardness is between about 35 shore A and 60 shore D.

7. The marine hydrocarbon application cable of claim 5, wherein the fiber is one selected from a group consisting of glass, carbon, graphite, clay, silica, and polyfluorotetraethylene.

8. The marine hydrocarbon cable of claim 5, wherein:
   the interior layer disposes a first wire therein; and
   the exterior layer disposed a second wire therein.

* * * * *